(12) United States Patent
Celis Torres

(10) Patent No.: US 10,494,843 B2
(45) Date of Patent: Dec. 3, 2019

(54) DEVICE FOR HOLDING A FLOOR PANEL OF A VEHICLE IN AN OPEN POSITION TO PROVIDE ACCESS TO AN UNDERFLOOR STORAGE COMPARTMENT DISPOSED UNDERNEATH THE FLOOR PANEL

(71) Applicant: GM Global Technology Operations LLC, Detroit, MI (US)

(72) Inventor: Williams Reynaldo Celis Torres, Metepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 423 days.

(21) Appl. No.: 15/408,754

(22) Filed: Jan. 18, 2017

(65) Prior Publication Data

US 2018/0202202 A1    Jul. 19, 2018

(51) Int. Cl.
| | |
|---|---|
| *B60R 5/04* | (2006.01) |
| *B60R 11/00* | (2006.01) |
| *E05C 17/50* | (2006.01) |
| *E05C 17/08* | (2006.01) |

(52) U.S. Cl.
CPC .............. *E05C 17/085* (2013.01); *B60R 5/04* (2013.01); *E05C 17/50* (2013.01); *B60R 2011/0029* (2013.01); *B60R 2011/0036* (2013.01)

(58) Field of Classification Search
CPC ......... E05C 17/085; E05C 17/50; B60R 5/04; B60R 2011/0029; B60R 2011/0036

USPC ...................................................... 296/37.14
See application file for complete search history.

(56) References Cited

U.S. PATENT DOCUMENTS

| | | | | |
|---|---|---|---|---|
| 7,661,742 | B2 * | 2/2010 | Medlar ..................... | B60R 5/04 |
| | | | | 296/37.14 |
| 8,128,146 | B2 * | 3/2012 | Sogame .................... | B60R 7/02 |
| | | | | 296/37.14 |
| 2010/0090502 | A1 * | 4/2010 | Mercurio .................. | B60R 5/04 |
| | | | | 296/193.07 |
| 2013/0175821 | A1 * | 7/2013 | Simon ....................... | B60R 5/04 |
| | | | | 296/37.14 |
| 2014/0049065 | A1 * | 2/2014 | Tosco ........................ | B60R 5/04 |
| | | | | 296/37.14 |
| 2015/0232035 | A1 * | 8/2015 | Adolf ....................... | B60R 5/044 |
| | | | | 296/37.14 |
| 2017/0080869 | A1 * | 3/2017 | Clifford .................... | B60R 7/04 |
| 2017/0129412 | A1 * | 5/2017 | Lewis ........................ | B60R 7/08 |
| 2018/0202202 | A1 * | 7/2018 | Celis Torres ............. | B60R 5/04 |

* cited by examiner

*Primary Examiner* — Gregory A Blankenship

(57) ABSTRACT

A device holds a floor of a vehicle in an open position to provide access to an underfloor storage compartment that is covered by the floor when the floor is in a closed position. The device includes a mounting bracket fixed to the vehicle and a support tab pivotally connected to the mounting bracket. The support tab pivots between a first position in the path of the floor and a second position outside of the path of the floor. The support tab pivots in a first direction from the first position to the second position when the floor contacts a bottom surface of the support tab as the floor is raised past the support tab. The support tab automatically returns to the first position. The support tab supports and holds the floor in the open position when the floor is lowered onto the support tab.

19 Claims, 7 Drawing Sheets

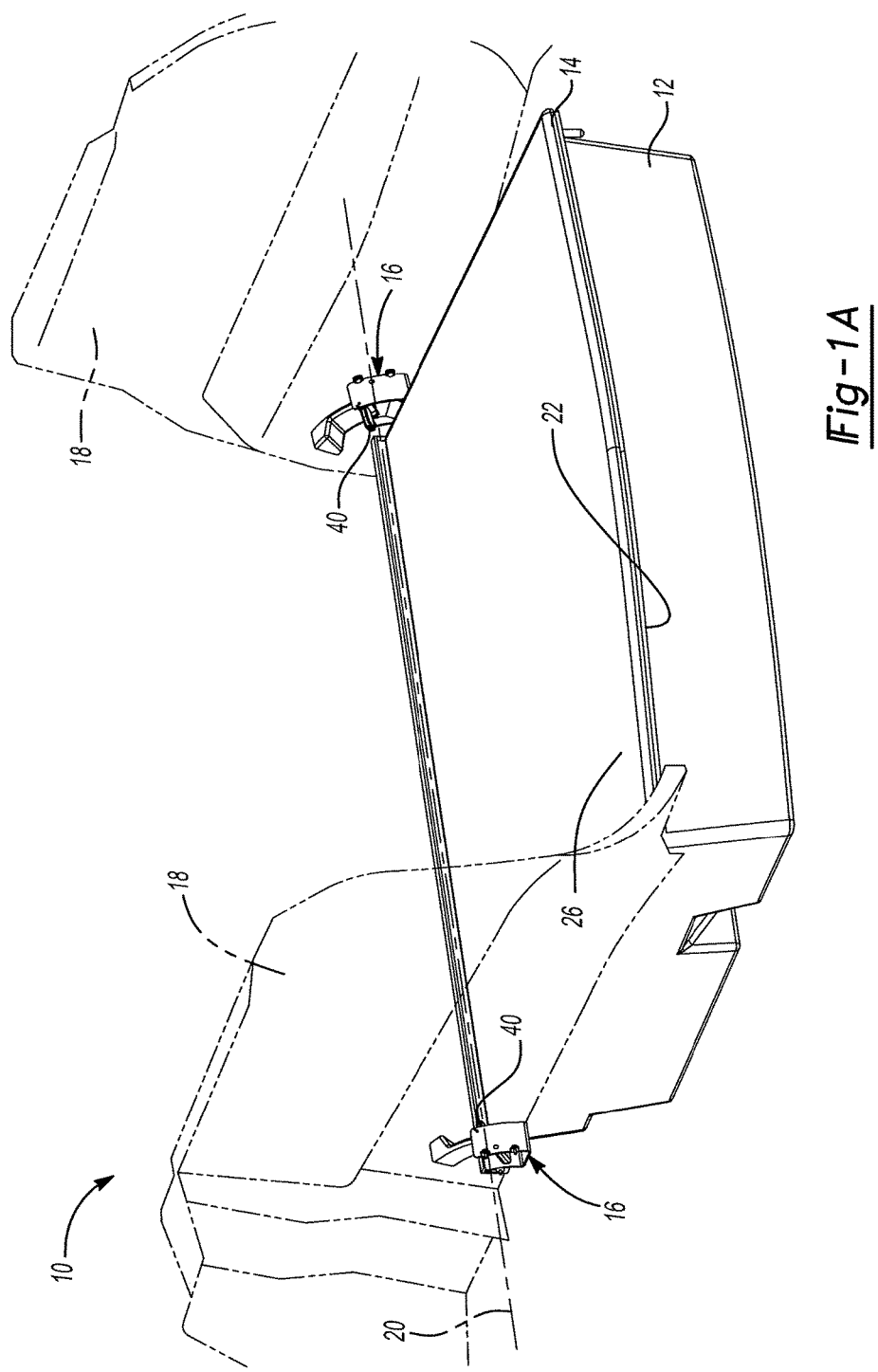

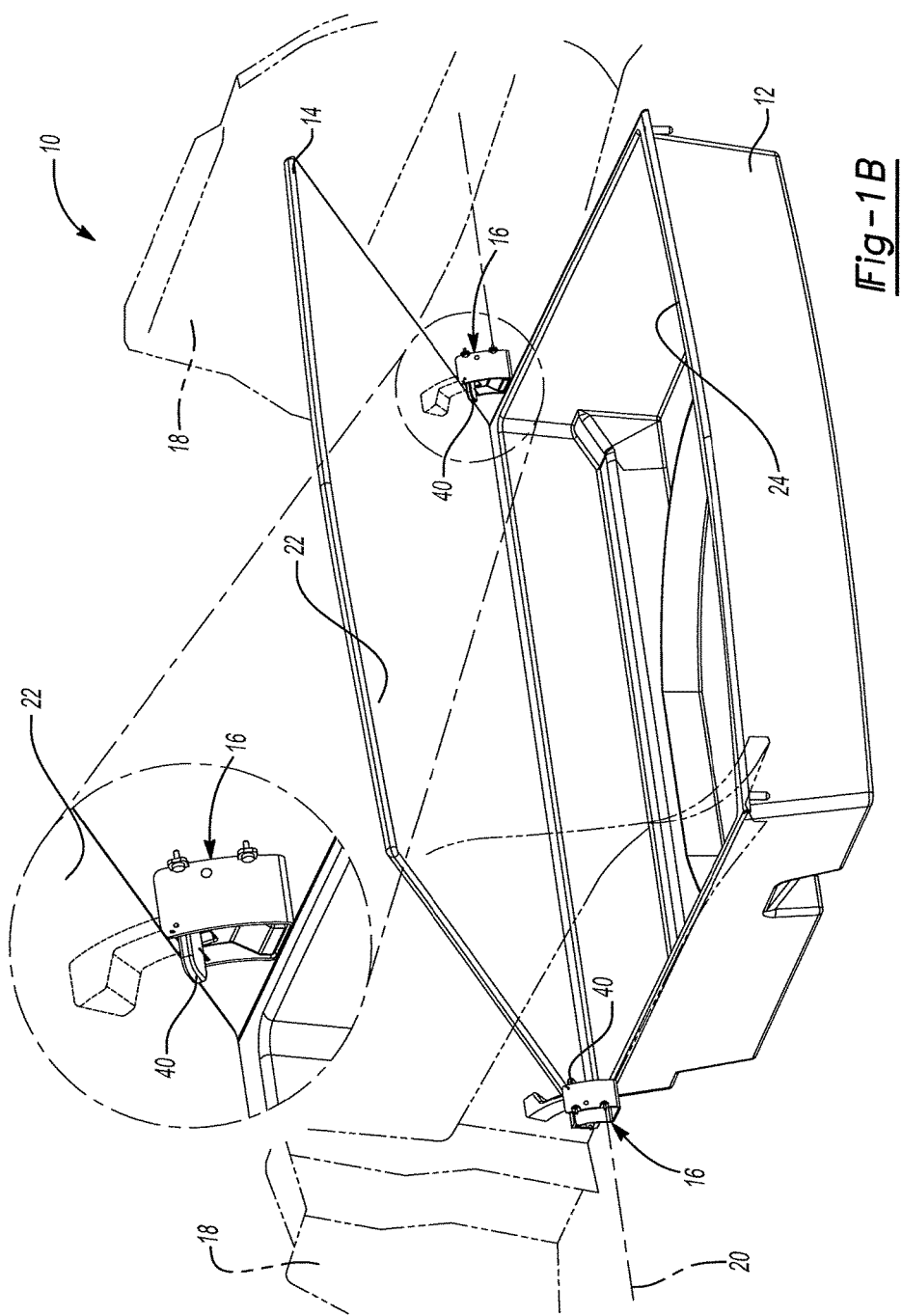

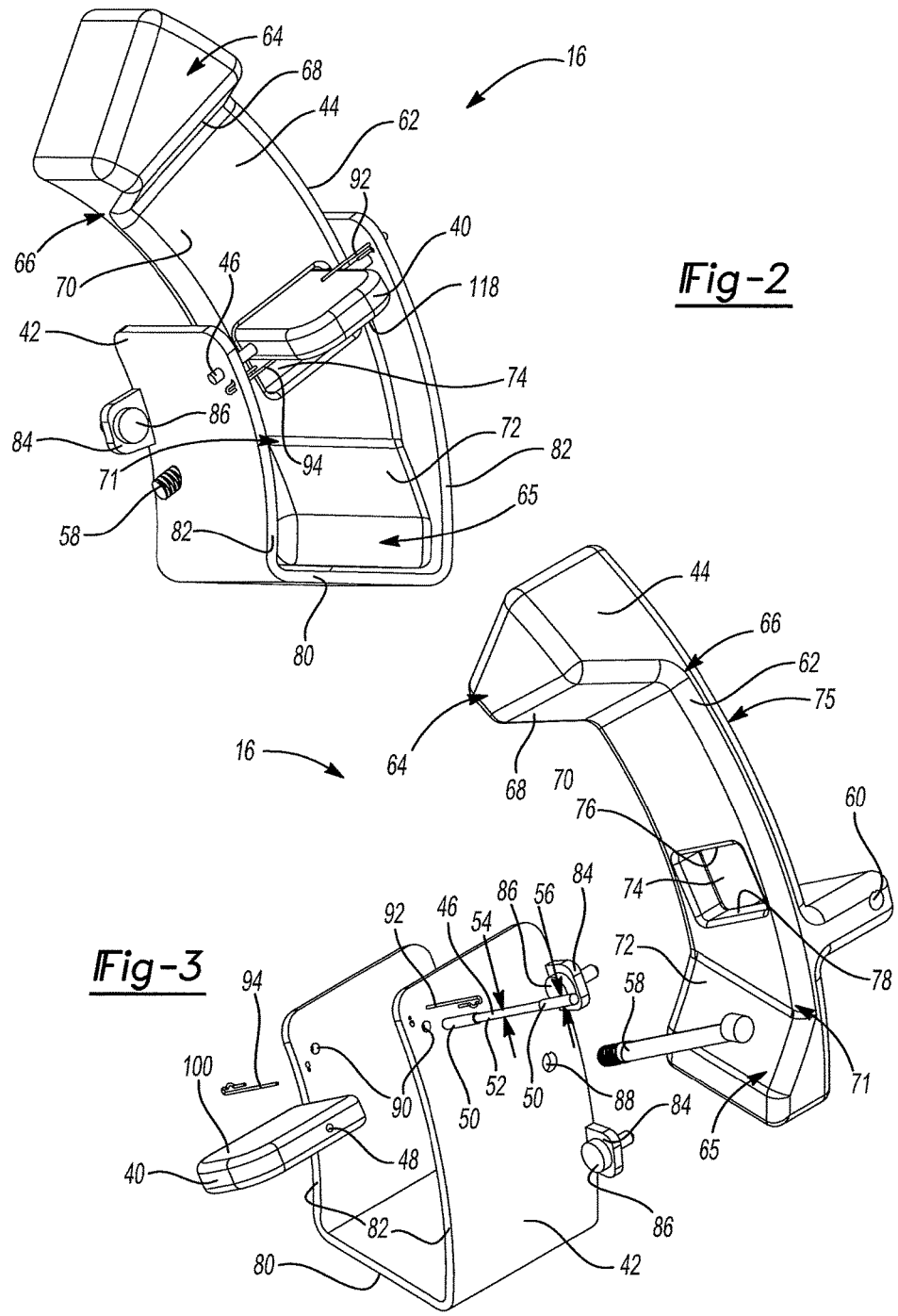

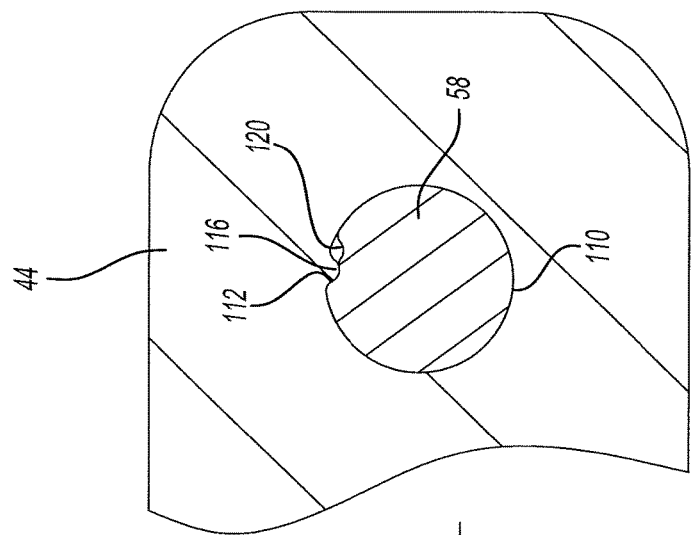
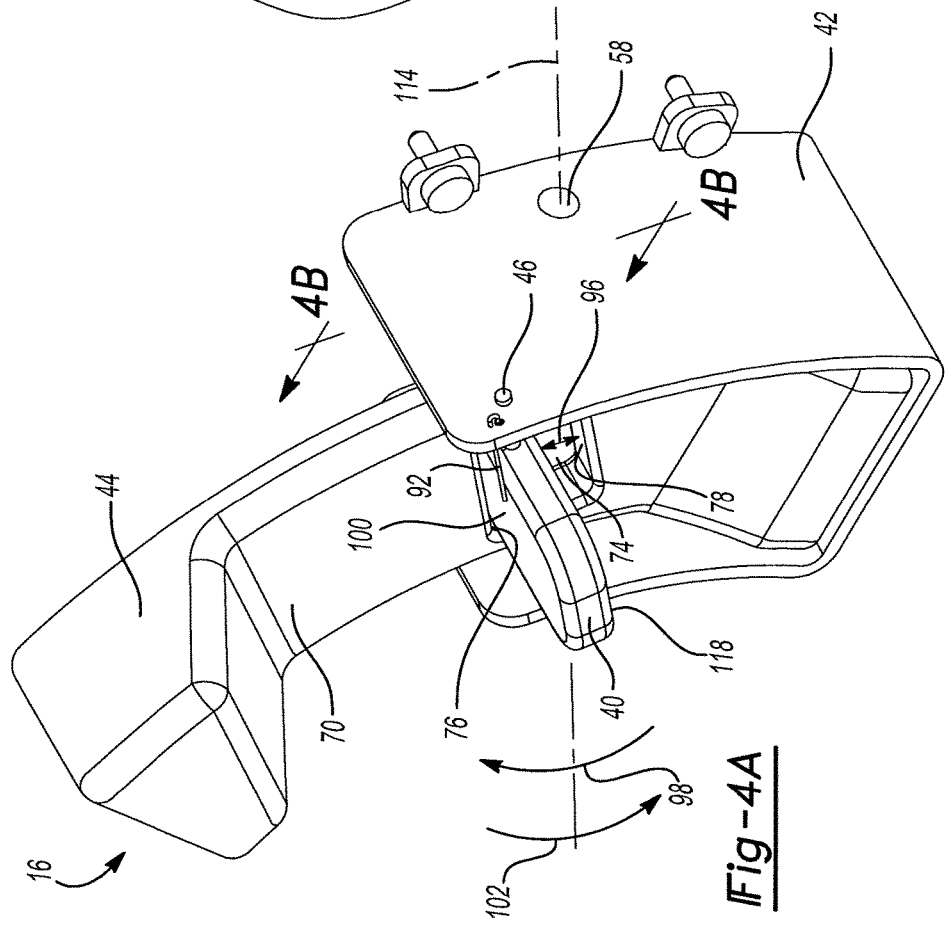

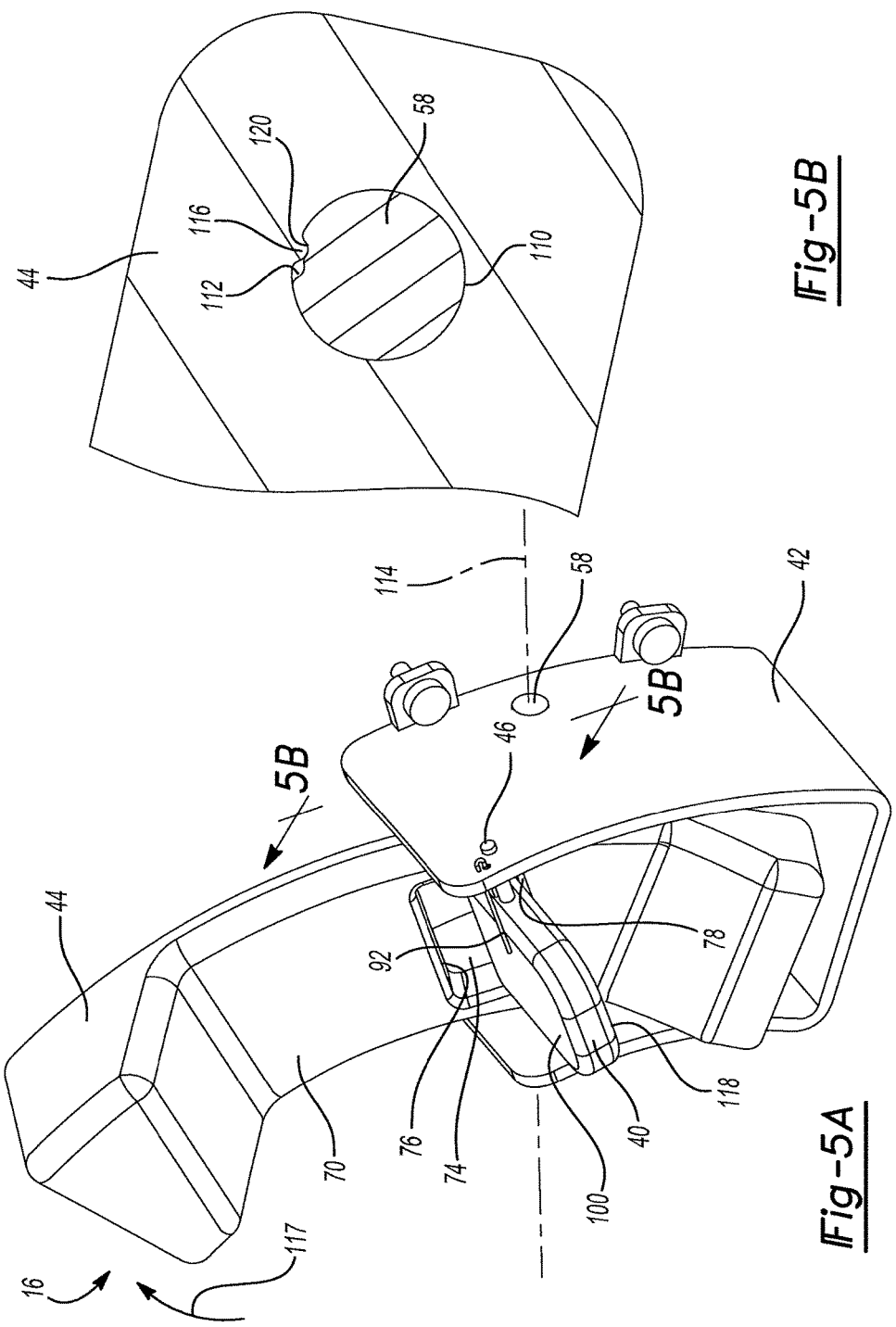

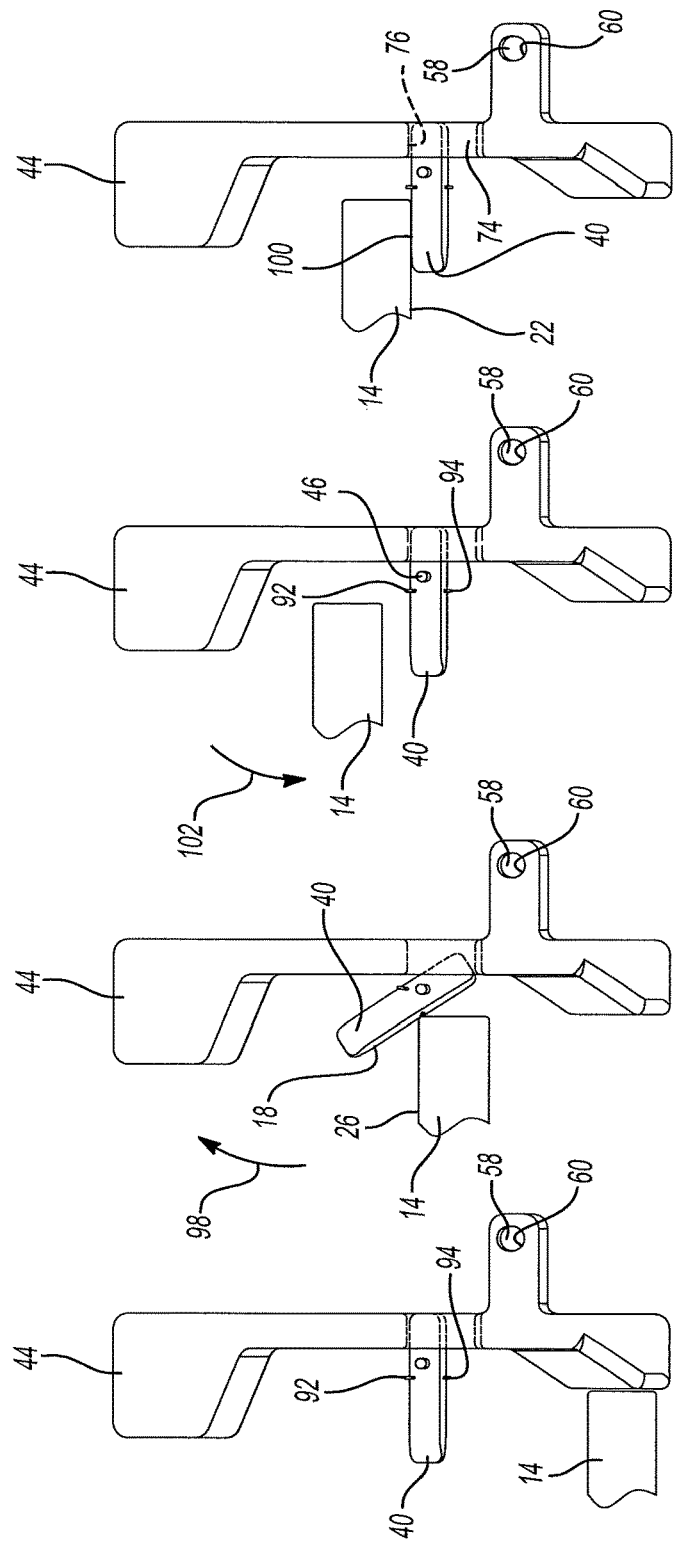

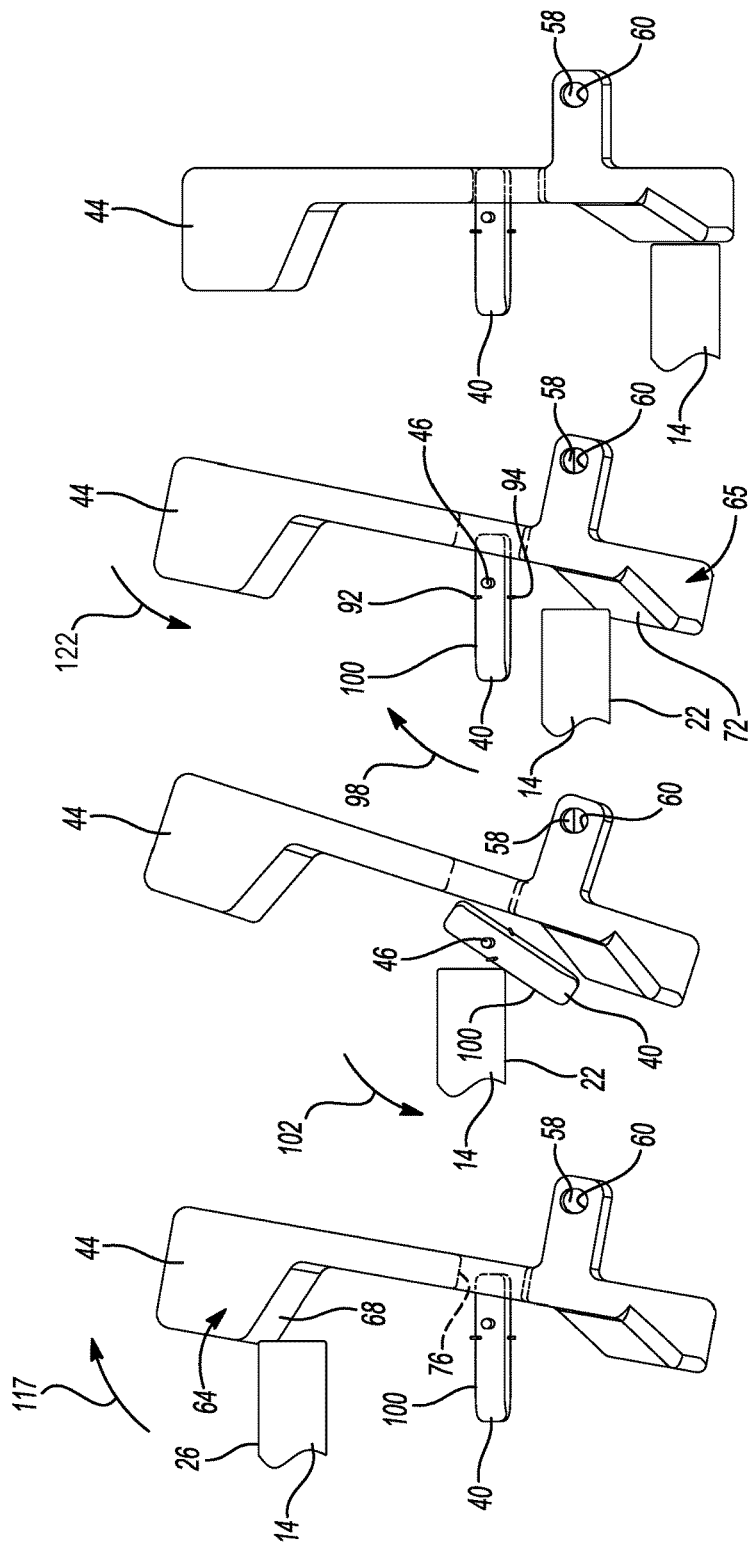

DEVICE FOR HOLDING A FLOOR PANEL OF A VEHICLE IN AN OPEN POSITION TO PROVIDE ACCESS TO AN UNDERFLOOR STORAGE COMPARTMENT DISPOSED UNDERNEATH THE FLOOR PANEL

FIELD

The present disclosure relates to devices for holding a floor panel of a vehicle in an open position to provide access to an underfloor storage compartment disposed underneath the floor panel.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many vehicles are equipped with one or more storage compartments. For example, storage compartments may be located under the floor panel of a trunk, in a console between seats, or in a truck bed. Some storage compartments are covered with a lid or a cover that can be opened to provide access to the storage compartment. In some cases, the cover is a floor panel that is configured to support a load when the storage compartment is closed.

SUMMARY

The present disclosure describes a device for holding a floor of a vehicle in an open position to provide access to an underfloor storage compartment that is covered by the floor when the floor is in a closed position. The device includes a mounting bracket and a support tab. The mounting bracket is configured to be fixed to a body structure of the vehicle. The support tab is connected to the mounting bracket. The support tab is pivotable relative to the mounting bracket between a first position and a second position. In the first position, the support tab is disposed in a path of the floor. In the second position, the support tab is disposed outside of the path of the floor. The support tab is configured to pivot in a first direction from the first position to the second position when the floor contacts a bottom surface of the support tab as the floor is raised past the support tab. The support tab is configured to automatically return to the first position. The support tab is configured to support and hold the floor in the open position when the floor is lowered onto the support tab.

In some configurations, the device further comprises a locking member. The locking member is connected to the mounting bracket. The locking member defines a cavity having an interference surface. The interference surface contacts a top surface of the support tab when the support tab is in the first position to prevent the support tab from pivoting in a second direction opposite of the first direction.

In some configurations, the device further comprises a biasing member. The biasing member biases the support tab toward the interference surface of the cavity in the locking member to maintain the support tab in the first position.

In some configurations, the locking member is pivotable relative to the mounting bracket between a locked position and an unlocked position. The interference surface of the locking member contacts the top surface of the support tab to prevent the support tab from pivoting away from the first position in the second direction when the locking member is in the locked position. The interference surface of the locking member does not contact the top surface of the support tab when the locking member is in the unlocked position and the support tab pivots away from the first position in the second direction when the locking member is in the unlocked position.

In some configurations, the device further comprises a pivot pin that is fixed to the mounting bracket. The pivot pin extends through the mounting bracket and the locking member. The locking member pivots about the pivot pin between the locked position and the unlocked position.

In some configurations, the pivot pin extends through a pivot aperture in the locking member. An outer surface of the pivot pin defines a first detent that extends along a longitudinal axis of the pivot pin. The first detent engages a protrusion in the pivot aperture when the locking member is in the locked position. The outer surface of the pivot pin defines a second detent that extends along the longitudinal axis of the pivot pin. The second detent engages the protrusion when the locking member is in the unlocked position.

In some configurations, the mounting bracket includes a bottom plate and a pair of side plates. The pair of side plates is disposed on opposite sides of the locking member. The pivot pin extends through the side plates of the mounting bracket and through a pivot aperture in the locking member.

In some configurations, the side plates and the locking member are curved in a direction of rotation of the floor as the floor is rotated between the closed position and the open position.

In some configurations, the locking member includes a body that defines the cavity, an upper projection portion, and a lower projection portion. The upper projection portion projects from an upper end of the body. The lower projection portion projects from a lower portion of the body. The locking member pivots from the locked position to the unlocked position when the floor engages the upper projection portion. The locking member pivots from the unlocked position to the locked position when the floor engages the lower projection portion.

In some configurations, the upper portion is configured to engage the floor when the floor is raised past the upper projection portion while the locking member is in the locked position. The lower projection portion is configured to engage the floor when the floor is lowered past the lower projection portion while the locking member is in the unlocked position.

The present disclosure describes another device for holding a floor of a vehicle in an open position to provide access to an underfloor storage compartment that is covered by the floor when the floor is in a closed position. The device includes a support tab and a locking member. The support tab is configured to be coupled to a body structure of the vehicle. The support tab is configured to pivot between a first position and a second position. In the first position, the support tab is disposed in a path of the floor. In the second position, the support tab is disposed outside of the path of the floor. The support tab is configured to pivot in a first direction from the first position to the second position when the floor contacts a bottom surface of the support tab as the floor is raised past the support tab. The support tab is configured to automatically return to the first position and to support and hold the floor in the open position when the floor is lowered onto the support tab. The locking member is configured to be coupled to a body structure of the vehicle.

The locking member is configured to allow the support tab to pivot in the first direction while preventing the support tab from pivoting away from the first position in a second direction opposite the first direction.

In some configurations, the locking member is pivotable between a locked position and an unlocked position. The locking member prevents the support tab from pivoting away from the first position in the second direction when the locking member is in the locked position. The locking member allows the support tab to pivot away from the first position in the second direction when the locking member is in the unlocked position.

In some configurations, the locking member defines a cavity having an interference surface. The support tab is at least partially disposed in the cavity when the support tab is in the first position. The interference surface contacts a top surface of the support tab to prevent the support tab from pivoting in the second direction away from the first position.

In some configurations, when the support tab is in the first position, the support tab is located closer to the interference surface than to a clearance surface of the cavity opposite of the interference surface to allow the support tab to pivot away from the first position in the first direction.

In some configurations, the device further comprises a mounting bracket configured to be fixed to the body structure. The support tab and the locking member are pivotally connected to the mounting bracket and coupled to the body structure through the mounting bracket.

In some configurations, the mounting bracket includes a bottom plate and a pair of side plates. The side plates extend from opposite ends of the bottom plate. The support tab and the locking member are disposed between the side plates. The support tab and the locking member are pivotally connected to the side plates.

In some configurations, the device comprises a first pivot pin and a second pivot pin. The first pivot pin pivotally connects the support tab to the mounting bracket. The second pivot pin pivotally connects the locking member to the mounting bracket.

The present disclosure describes yet another device for holding a floor of a vehicle in an open position to provide access to an underfloor storage compartment that is covered by the floor when the floor is in a closed position. The device comprises a mounting bracket, a support tab, a biasing member, and a locking member. The mounting bracket is configured to be fixed to a body structure of the vehicle. The mounting structure includes a bottom plate and a pair of side plates extending from the bottom plate. The support tab is disposed between the side plates. The support tab is pivotally connected to the side plates. The support tab is pivotable between a first position and a second position. In the first position, the support tab is disposed in a path of the floor. In the second position, the support tab is disposed outside of the path of the floor. The support tab is configured to pivot in a first direction from the first position to the second position when the floor contacts a bottom surface of the support tab as the floor is raised past the support tab. The biasing member is configured to bias the support tab toward the first position and thereby cause the support tab to automatically return from the second position to the first position. The support tab holds the floor in the open position when the floor is lowered onto the support tab and the support tab is in the first position. The locking member is configured to be coupled to the body structure. The locking member defines a cavity in which the support tab is at least partially disposed. The cavity allows the support tab to pivot in the first direction while preventing the support tab from pivoting away from the first position in a second direction opposite the first direction.

In some configurations, the cavity in the locking member has an interference surface. The interference surface of the cavity contacts a top surface of the support tab when the support tab is in the first position to prevent the support tab from pivoting in the second direction.

In some configurations, the cavity in the locking member has a clearance surface opposite of the interference surface. The support tab is located closer to the interference surface than to the clearance surface when the support tab is in the first position to allow the support tab to pivot away from the first position in the first direction.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of a storage area of a vehicle including a storage compartment, a floor panel shown in a closed position, and devices for holding the floor panel in an open position according to the present disclosure;

FIG. 1B is a perspective view of the storage area of FIG. 1A showing the floor panel in an open position;

FIG. 2 is a perspective view of one of the devices of FIG. 1A for holding the floor panel in an open position;

FIG. 3. is an exploded perspective view of the device of FIG. 2;

FIG. 4A is a perspective view of the device of FIG. 2 showing a locking member of the device in a locked position;

FIG. 4B is a partial cross-sectional view taken at line 4B-4B in FIG. 4A showing a protrusion on the locking member of the device engaging a first detent in a pivot pin;

FIG. 5A is a perspective view of the device of FIG. 2 showing the locking member in an unlocked position;

FIG. 5B is a partial cross-sectional view taken at line 5B-5B in FIG. 5A showing the protrusion on the locking member engaging a second detent in the pivot pin;

FIG. 6A is a side view of the device of FIG. 2 showing a floor panel in a closed position;

FIG. 6B is a side view of the device of FIG. 2 showing the floor panel being opened and engaging a bottom surface of a support tab of the device;

FIG. 6C is a side view of the device of FIG. 2 showing the floor panel being opened after being moved past the support tab;

FIG. 6D is a side view of the device of FIG. 2 showing the floor panel in an open position and resting on a top surface of the support tab;

FIG. 6E is a side view of the device of FIG. 2 showing the floor panel being closed and engaging an upper protrusion of the locking member to pivot the locking member to an unlocked position;

FIG. 6F is a side view of the device of FIG. 2 showing the floor panel being closed and engaging the top surface of the support tab;

FIG. 6G is a side view of the device of FIG. 2 showing the floor panel being closed and engaging a lower protrusion on the locking member to pivot the locking member to a locked position; and FIG. 6H is a side view of the device of FIG. 2 showing the floor panel in the closed position.

In the drawings, reference numbers may be reused to identify similar and/or identical elements.

DETAILED DESCRIPTION

A storage area of some vehicles includes a floor panel for covering an underfloor storage compartment. The storage area may be located in or on a vehicle, for example in an automobile trunk, in a console in the cap, or in truck bed, by way of non-limiting example. The floor panel is adapted to pivot between an open position and a closed position. In the closed position, the storage compartment is covered and the floor panel may be used to support loads. In an open position, the storage compartment is accessible and the floor panel is disposed at an angle with respect to the top of the storage compartment.

Covers or floor panels can be lifted and manually held open while an operator accesses the storage compartment. Alternatively, a device may be provided to hold a cover open. For example, a cord fixed to an underside of the floor panel includes a hook that is adapted to connect to a top of the trunk to hold the floor panel open. Hook and cord devices require two-handed operation, as one hand lifts the floor panel and the other hand secures the hook to the top of the trunk. Thus, use of such a device is combersome and requires several steps as the operator must use both hands to hold the floor panel open while hooking the floor panel to the top of the truck, retrieve an object from the storage compartment, and then use both hands again to hold the floor panel open while unhooking the floor panel.

In another example, a storage bin includes a hinged cover and a groove adjacent to the storage bin and parallel to the hinge. The cover overhangs the hinge so that it covers the groove. An operator manually pivots the cover open, which forces the overhang into the groove to hold the cover open while the storage bin is accessed. The operator then pulls the cover down to force the overhang out of the groove and close the storage bin. However, this design is not robust to high closing forces.

The present disclosure provides a device for holding a floor panel in an open position to provide access to a storage compartment located underneath the floor panel. An operator can use the device to open and close the floor panel with one hand. To open the floor panel, an operator lifts the floor panel and sets it down on a support tab or tongue of the device. The support tab holds the floor panel open. To close the floor panel, the operator lifts the floor panel to pivot the device into an unlocked position, and then lowers the floor panel to the closed position. Lowering the floor panel pivots the device back into a locked position.

Referring to FIGS. 1A and 1B, a storage area 10 of a vehicle according to certain aspects of the present disclosure is shown. In one example, the storage area 10 is the trunk of the vehicle. The storage area 10 includes a storage compartment 12, a floor panel 14, and two devices 16 for holding the floor panel 14 open to provide access to the storage compartment 12. The devices 16 are fixed to a body structure 18 on opposing sides of the vehicle. Although the storage area 10 is shown with two devices 16, other quantities of devices are contemplated within the scope of the present discloser. For example, a storage area may include a single device fixed to the vehicle body and configured to support a floor panel. A storage area may also include more than two devices, for example, to support heavier loads.

The floor panel 14 pivots about a floor panel axis 20 between a closed position, as shown in FIG. 1A, and an open position, as shown in FIG. 1B. In the closed position, a bottom surface 22 of the floor panel 14 engages a top surface 24 of the storage compartment 12, and the floor panel 14 is supported by the storage compartment 12. Also, in the closed position, a top surface 26 of the floor panel 14 is configured to support loads. In the open position, the bottom surface 22 of the floor panel 14 engages a support tab 40 of the device 16.

Referring now to FIGS. 2 and 3, the device 16 includes the support tab 40, a mounting bracket 42, and a locking member 44. The support tab 40 is connected to the mounting bracket 42 and pivotable with respect to the mounting bracket 42. A first pivot pin 46 pivotally connects the support tab 40 to the mounting bracket 42. More specifically, the first pivot pin 46 extends through a first pivot aperture 48 in the support tab 40 and through a pair of apertures 90 in the mounting bracket 42.

The first pivot pin 46 includes opposing ends 50 that are fixed to the mounting bracket 42. A central portion 52 of the first pivot pin 46 has a first diameter 54 and the opposing ends 50 of the first pivot pin 46 have a second diameter 56. The second diameter 56 is larger than the first diameter 54. The second diameter 56 is also larger than a diameter of the first pivot aperture 48 to retain the support tab 40 on the central portion 52 of the first pivot pin 46. In addition, the second diameter 56 may be greater than or equal to a diameter of the apertures 90 in the mounting bracket 42 to yield an interference fit between the opposing ends 50 of the first pivot pin 46 and the apertures 90.

The locking member 44 is connected to the mounting bracket 42 and pivotable with respect to the mounting bracket 42. A second pivot pin 58 connects the locking member 44 to the mounting bracket 42. The second pivot pin 58 extends through a second pivot aperture 60 in the locking member 44 and a pair of apertures 88 in the mounting bracket 42.

The locking member 44 includes a body 62, an upper projection portion 64, and a lower projection portion 65. The upper projection portion 64 projects from an upper end 66 of the body 62 in a direction away from a front surface 70 of the body 62, and the upper projection portion 64 is integrally formed with the body 62. The upper projection portion 64 includes an upper contact surface 68 that forms an angle with the front surface 70 of the body 62. The angle between the upper contact surface 68 and the front surface 70 is greater than about 90 degrees (°) and less than about 180°, optionally greater than about 115° and less than about 135°, optionally about 120°.

The lower projection portion 65 projects from a lower end 71 of the body 62 in in the same direction in which the upper projection portion 64 projects from the upper end 66 of the body 62, and the upper projection portion 64 and is integrally formed with the body 62. The lower projection portion 65 includes a lower contact surface 72 that forms an angle with the front surface 70 of the body 62. The angle between the lower contact surface 72 and the front surface 70 is greater than about 90° and less than about 180°, optionally greater than about 125° and less than about 145°, optionally about 130°.

The body 62 defines a cavity 74 that extends through the front surface 70 of the body 62 and through a back surface 75 of the body 62 opposite of the front surface 70. The cavity 74 includes an interference surface 76 and a clearance surface 78 that opposes the interference surface 76. The cavity 74 has a shape that is adapted for the support tab 40.

The mounting bracket 42 includes a bottom plate 80 and opposing side plates 82 that are spaced apart from each other. The opposing side plates 82 are generally perpendicular to and integrally formed with the bottom plate 80. The mounting bracket 42 also includes flanges 84 for fixing the mounting bracket 42 to the body structure 18 of the vehicle (shown in FIGS. 1A and 1B). Thus, both the support tab 40 and the locking member 44 are connected to the body structure 18 of the vehicle through the mounting bracket 42. Fasteners 86 may extend through respective flanges 84 for attachment of the mounting bracket 42 to the body structure 18. The opposing side plates 82 define the apertures 88 that receive the first pivot pin 46 and the apertures 90 that receive the second pivot pin 58.

The locking member 44 is at least partially disposed between the opposing side plates 82 of the mounting bracket. The side plates 82 of the mounting bracket 42 and the locking member 44 are curved in a direction of rotation of the floor panel 14 as the floor panel 14 is rotated between the closed position and the open position. The support tab 40 is at least partially disposed within the cavity 74 of the locking member 44. First and second biasing members or locating springs 92, 94 are fixed to the mounting bracket 42 and engage the support tab 40.

The locking member 44 is configured to pivot between a locked position and an unlocked position. The locking member 44 is shown in the locked position in FIGS. 4A and 4B, and the locking member 44 is shown in the unlocked position in FIGS. 5A and 5B. Referring now to FIG. 4A, in a locked position, the support tab 40 is in a first position. In the first position, the support tab 40 forms a right angle with the front surface 70 of the locking member 44.

The support tab 40 is closer to the interference surface 76 than the clearance surface 78 when the support tab 40 is in the first position. Thus, a bottom or underside surface 118 of the support tab 40 is spaced apart from the clearance surface 78 by a gap 96. The gap 96 enables the support tab 40 to pivot in a first direction 98 about the first pivot pin 46 to a second position shown in FIG. 6B. As the support tab 40 pivots in the first direction 98 from the first position to the second position, the support tab 40 travels through an angle between about 30° and about 60° (e.g., an angle equal to about 45°). The interference surface 76 of the cavity 74 of the locking member 44 engages a top surface 100 of the support tab 40 when the locking member 44 is in the locked position to prevent the locking member from pivoting in a second direction 102 about the first pivot pin 46 that is opposite the first direction 98.

With reference to FIG. 4B, the second pivot pin 58 includes an outer surface 110. The outer surface 110 defines a first detent 112 that extends along a longitudinal axis 114 (FIG. 4A) of the second pivot pin 58. The second pivot aperture 60 of the locking member 44 includes a protrusion 116 that engages the first detent 112 when the locking member 44 is in a locked position.

Returning to FIG. 4A, the first biasing member 92 engages the top surface 100 of the support tab 40. The second biasing member 94 engages the bottom surface 118 of the support tab 40 (shown in FIG. 2). The first and second biasing members 92, 94 apply a biasing force to the support tab 40 to maintain the support tab 40 in the first position absent application of an external force.

The first biasing member 92 biases the support tab 40 in the second direction 102 toward the interference surface 76 of the cavity 74 in the locking member 44. Thus, if an external force is applied to pivot the support tab 40 from the first position to the second position as shown in FIG. 6B, and then that external force is removed, the support tab 40 is automatically returned to the first position. The second biasing member 94 biases the support tab 40 in the first direction 98 toward the clearance surface 78 of the cavity 74 in the locking member 44. Thus, if an external force is applied to pivot the support tab 40 from the first position to a third position as shown in FIG. 6F, and then that external force is removed, the support tab 40 is automatically returned to the first position. In addition, the biasing force applied by the second biasing member 94 prevents the support tab 40 from pivoting in the second direction 102 under the influence of gravity.

To adjust the locking member 44 from the locked position shown in FIGS. 4A and 4B to the unlocked position shown in FIGS. 5A and 5B, the locking member 44 is rotated in a third direction 117 (FIG. 5A). The angle of rotation of the locking member 44 from a locked to an unlocked position is greater than or equal to about 5° and less than or equal to about 60°, optionally greater than or equal to about 15° and less than or equal to about 45°, optionally about 30°. Referring to FIG. 5A, when the locking member 44 is in the unlocked position, the top surface 100 of the support tab 40 is disengaged from the interference surface 78 of the cavity 74 of the locking member 44. Thus, when the locking member 44 is in the unlocked position, the support tab 40 is allowed to pivot in the second direction 102 to the third position.

With reference to FIG. 5B, the second pivot pin 58 includes a second detent 120 defined by the outer surface 110. The second detent 120 extends along the longitudinal axis 114. The protrusion 116 of the second pivot aperture 60 engages the second detent 120 in an unlocked position.

With reference to FIGS. 6A-6H, the locking member 44 is operable to pivot from the locked position to the unlocked position in response to engagement with the floor panel 14. In FIG. 6A, the floor panel 14 is closed so that it covers the storage compartment 12 (shown in FIG. 1A). The locking member 44 is in its locked position and the protrusion 116 of the second pivot aperture 60 engages the first detent of the second pivot pin 58 (shown in FIG. 4B). Engagement of the protrusion 116 with the first detent 112 holds the locking member 44 in the locked position. The support tab 40 is maintained in the first position by the first and second biasing members 92, 94.

In FIG. 6B, the floor panel 14 is raised or pivoted about the floor panel axis 20 (shown in FIG. 1A). The floor panel 14 can be raised by a person using only one hand. The top surface 26 of the floor panel 14 engages the bottom surface 118 of the support tab 40. Engagement of the floor panel 14 with the support tab 40 causes the support tab 40 to pivot in the first direction 98 about the first pivot pin 46 to the second position. In the second position, the support tab 40 is disposed outside of the path of the floor panel 14. With reference to FIG. 6C, the floor panel 14 is raised past the open position until it is disengaged from the support tab 40. When the floor panel 14 is disengaged from the support tab 40, the first biasing member 92 causes the floor panel 14 to pivot in the second direction 102 about the first pivot pin 46 to return to the first position.

In FIG. 6D, the bottom surface 22 of the floor panel 14 engages the top surface 100 of the support tab 40 to hold the floor panel 14 in its open position and provide access to the storage compartment 12 (shown in FIG. 1B). The support tab 40 is maintained in the first position by engagement of the top surface 100 of the support tab 40 with the interference surface 76 of the cavity 74 of the locking member 44. In the first position, the support tab 40 is disposed in the path of the floor panel 14 so that the floor panel 14 is maintained in the open position.

Referring now to FIG. 6E, the floor panel 14 is raised relative to the open position. As the floor panel 14 is raised, it engages the upper projection portion 64 of the locking member 44. As the top surface 26 of the floor panel 14 slides along the upper contact surface 68 of the upper projection portion 64, the locking member 44 pivots in the third direction 117. As the locking member 44 pivots in the third direction 117, the protrusion 116 (FIG. 5B) of the second pivot aperture 60 is forced out of the first detent 112 (FIG. 5B) of the second pivot pin 58. The protrusion 116 then snaps into the second detent 120 (FIG. 5B). Engagement of the protrusion 116 with the second detent 120 maintains the locking member 44 in the unlocked position. In the unlocked position, the top surface 100 of the support tab 40 is disengaged from the interference surface 76 of the locking member. Thus, the support tab 40 is free to pivot away from its first position in the second direction 102.

In FIG. 6F, the locking member 44 is in its unlocked position. The protrusion 116 of the second pivot aperture 60 engages the second detent 120 of the second pivot pin 58 (shown in FIG. 5B). The floor panel 14 is lowered relative to the position of the floor panel 14 shown in FIG. 6E. Engagement of the bottom surface 22 of the floor panel 14 with the top surface 100 of the support tab 40 causes the support tab 40 to pivot in the second direction 102 about the first pivot pin 46 to its third position. In the third position, the support tab 40 is disposed outside the path of the floor panel 14.

With reference to FIG. 6G, the second biasing member 94 causes the support tab 40 to pivot about the first pivot pin 46 in the first direction 98 and return to the first position when the bottom surface 22 of the floor panel 14 disengages the top surface 100 of the support tab 40. The floor panel 14 is lowered until it engages the lower projection portion 65 of the locking member 44. As the bottom surface 22 of the floor panel 14 slides along the lower contact surface 72 of the lower projection portion 65 of the locking member 44, the locking member 44 pivots in a fourth direction 122 from the unlocked position to the locked position. As the locking member 44 pivots from the unlocked position to the locked position, the protrusion 116 of the second pivot aperture 60 is forced out of the second detent 120 of the second pivot pin 58 (shown in FIGS. 4B and 5B).

In FIG. 6H, the locking member 44 is returned to its locked position. The protrusion 116 of the second pivot aperture 60 of the locking member 44 engages the first detent 112 of the second pivot pin 58 (see FIG. 4B). The support tab 40 is in the first position. The floor panel 14 is closed so that it covers the storage compartment 12 (shown in FIG. 1A).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A device for holding a floor panel of a vehicle in an open position to provide access to an underfloor storage compartment that is covered by the floor panel when the floor panel is in a closed position, the device comprising:
   a mounting bracket configured to be fixed to a body structure of the vehicle;
   a support tab connected to the mounting bracket and pivotable relative to the mounting bracket between a first position in which the support tab is disposed in a path of the floor panel and a second position in which the support tab is disposed outside of the path of the floor panel, wherein the support tab is configured to pivot in a first direction from the first position to the second position when the floor panel contacts a bottom surface of the support tab as the floor panel is raised past the support tab, and the support tab is configured to automatically return to the first position and to support and hold the floor panel in the open position when the floor panel is lowered onto the support tab; and a locking member connected to the mounting bracket and defining a cavity having an interference surface, wherein the interference surface contacts a top surface of the support tab when the support tab is in the first position to prevent the support tab from pivoting in a second direction opposite of the first direction.

2. The device of claim 1 further comprising a biasing member that biases the support tab toward the interference surface of the cavity in the locking member to maintain the support tab in the first position.

3. The device of claim 1 wherein:
the locking member is pivotable relative to the mounting bracket between a locked position and an unlocked position;
the interference surface of the locking member contacts the top surface of the support tab to prevent the support tab from pivoting away from the first position in the second direction when the locking member is in the locked position; and
the interference surface of the locking member does not contact the top surface of the support tab when the locking member is in the unlocked position and the support tab pivots away from the first position in the second direction.

4. The device of claim 3 further comprising a pivot pin that is fixed to the mounting bracket and extends through the mounting bracket and the locking member, wherein the locking member pivots about the pivot pin between the locked position and the unlocked position.

5. The device of claim 4 wherein:
the pivot pin extends through a pivot aperture in the locking member;
an outer surface of the pivot pin defines a first detent that extends along a longitudinal axis of the pivot pin and engages a protrusion in the pivot aperture when the locking member is in the locked position; and
the outer surface of the pivot pin defines a second detent that extends along the longitudinal axis of the pivot pin and engages the protrusion in the pivot aperture when the locking member is in the unlocked position.

6. The device of claim 4 wherein the mounting bracket includes a bottom plate and a pair of side plates disposed on opposite sides of the locking member, the pivot pin extending through the side plates of the mounting bracket and through a pivot aperture in the locking member.

7. The device of claim 6 wherein the side plates and the locking member are curved in a direction of rotation of the floor panel as the floor panel is rotated between the closed position and the open position.

8. The device of claim 3 wherein the locking member includes a body that defines the cavity, a upper projection portion projecting from an upper end of the body, and a lower projection portion projecting from a lower end of the body, the locking member pivoting from the locked position to the unlocked position when the floor panel engages the upper projection portion, and the locking member pivoting from the unlocked position to the locked position when the floor panel engages the lower projection portion.

9. The device of claim 8 wherein:
the upper projection portion is configured to engage the floor panel when the floor panel is raised past the upper projection portion while the locking member is in the locked position; and
the lower projection portion is configured to engage the floor panel when the floor panel is lowered past the lower projection portion while the locking member is in the unlocked position.

10. A device for holding a floor panel of a vehicle in an open position to provide access to an underfloor storage compartment that is covered by the floor panel when the floor panel is in a closed position, the device comprising:
a support tab configured to be coupled to a body structure of the vehicle and pivot relative to the body structure between a first position in which the support tab is disposed in a path of the floor panel and a second position in which the support tab is disposed outside of the path of the floor panel, wherein the support tab is configured to pivot in a first direction from the first position to the second position when the floor panel contacts a bottom surface of the support tab as the floor panel is raised past the support tab, and the support tab is configured to automatically return the first position and to support and hold the floor panel in the open position when the floor panel is lowered onto the support tab; and
a locking member configured to be coupled to the body structure and to allow the support tab to pivot in the first direction while preventing the support tab from pivoting away from the first position in a second direction opposite of the first direction.

11. The device of claim 10 wherein:
the locking member is pivotable between a locked position and an unlocked position;
the locking member prevents the support tab from pivoting away from the first position in the second direction when the locking member is in the locked position; and
the locking member allows the support tab to pivot away from the first position in the second direction when the locking member is in the unlocked position.

12. The device of claim 11 wherein:
the locking member defines a cavity having an interference surface;
the support tab is at least partially disposed in the cavity when the support tab is in the first position; and
the interference surface contacts a top surface of the support tab to prevent the support tab from pivoting in the second direction away from the first position.

13. The device of claim 12 wherein, when the support tab is in the first position, the support tab is located closer to the interference surface than to a clearance surface of the cavity opposite of the interference surface to allow the support tab to pivot away from the first position in the first direction.

14. The device of claim 10 further comprising a mounting bracket configured to be fixed to the body structure, wherein the support tab and the locking member are pivotally connected to the mounting bracket and coupled to the body structure through the mounting bracket.

15. The device of claim 14 wherein:
the mounting bracket includes a bottom plate and a pair of side plates extending from opposite ends of the bottom plate; and the support tab and the locking member are disposed between the side plates and pivotally connected to the side plates.

16. The device of claim 15 further comprising:
a first pivot pin pivotally connecting the support tab to the mounting bracket; and
a second pivot pin pivotally connecting the locking member to the mounting bracket.

17. A device for holding a floor panel of a vehicle in an open position to provide access to an underfloor storage compartment that is covered by the floor panel when the floor panel is in a closed position, the device comprising:
a mounting bracket configured to be fixed to a body structure of the vehicle and including a bottom plate and a pair of side plates extending from the bottom plate;
a support tab disposed between the side plates and pivotally connected to the side plates, wherein the support tab is pivotable between a first position in which the support tab is disposed in a path of the floor panel and a second position in which the support tab is disposed outside of the path of the floor panel, and the support tab is configured to pivot in a first direction from the first position to the second position when the floor panel contacts a bottom surface of the support tab as the floor panel is raised past the support tab;
a biasing member configured to bias the support tab toward the first position and thereby cause the support tab to automatically return from the second position to the first position, wherein the support tab holds the floor panel in the open position when the floor panel is lowered onto the support tab and the support tab is in the first position; and
a locking member configured to be coupled to the body structure and defining a cavity in which the support tab is at least partially disposed, the cavity allowing the support tab to pivot in the first direction while preventing the support tab from pivoting away from the first position in a second direction opposite of the first direction.

18. The device of claim 17 wherein:
the cavity in the locking member has an interference surface; and
the interference surface of the cavity contacts a top surface of the support tab when the support tab is in the first position to prevent the support tab from pivoting in the second direction.

19. The device of claim 18 wherein:
the cavity in the locking member has a clearance surface opposite of the interference surface; and
the support tab is located closer to the interference surface than to the clearance surface when the support tab is in the first position to allow the support tab to pivot away from the first position in the first direction.

* * * * *